United States Patent
Alakuijala et al.

(10) Patent No.: US 10,438,328 B1
(45) Date of Patent: Oct. 8, 2019

(54) CHROMA BLURRING REDUCTION IN VIDEO AND IMAGES

(71) Applicant: GOOGLE INC., Mountain View, CA (US)

(72) Inventors: Jyrki Alakuijala, Wollerau (CH); Pascal Massimino, Orsay (FR); Lode Vandevenne, Rüschlikon (CH)

(73) Assignee: GOOGLE LLC, Mountain View, CA (US)

( * ) Notice: Subject to any disclaimer, the term of this patent is extended or adjusted under 35 U.S.C. 154(b) by 323 days.

(21) Appl. No.: 15/380,118

(22) Filed: Dec. 15, 2016

(51) Int. Cl.
*G06T 5/00* (2006.01)
*G06T 7/90* (2017.01)

(52) U.S. Cl.
CPC ............... *G06T 5/004* (2013.01); *G06T 7/90* (2017.01)

(58) Field of Classification Search
CPC ........... G06T 5/003; G06T 5/004; G06T 7/90; H04N 9/646; G06K 7/146
USPC ........................................ 382/232, 254, 275
See application file for complete search history.

(56) References Cited

U.S. PATENT DOCUMENTS

| | | | |
|---|---|---|---|
| 9,563,941 B2* | 2/2017 | Oniki | G06T 5/004 |
| 2006/0013308 A1* | 1/2006 | Kim | H04N 19/186 |
| | | | 375/240.16 |
| 2010/0208989 A1* | 8/2010 | Narroschke | H04N 1/646 |
| | | | 382/166 |
| 2011/0305277 A1* | 12/2011 | Fu | H04N 5/21 |
| | | | 375/240.12 |
| 2016/0239942 A1* | 8/2016 | Usman | H04N 19/80 |

OTHER PUBLICATIONS

GlennChan "Toward Better Chroma Subsampling", SMPTE Motion Imaging Journal, pp. 39-45. (Year: 2007).*
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.

(Continued)

*Primary Examiner* — Daniel G Mariam
(74) *Attorney, Agent, or Firm* — Young Basile Hanlon & MacFarlane, P.C.

(57) ABSTRACT

A method includes obtaining, at one or more computing devices, an input image, applying an image sharpening process to at least one of one or more chroma components of the input image, subsampling the one or more chroma components of the input image to reduce a spatial resolution of the one or more chroma components of the input image, encoding the input image subsequent to applying the image sharpening process and subsampling, and performing at least one of storing or transmitting the input image subsequent to encoding.

24 Claims, 4 Drawing Sheets

(56) References Cited

OTHER PUBLICATIONS

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

\* cited by examiner

CHROMA BLURRING REDUCTION IN VIDEO AND IMAGES

CROSS-REFERENCE TO RELATED APPLICATION(S)

None.

TECHNICAL FIELD

This disclosure relates to high-frequency chroma sharpening to counteract chroma blurring in video and images.

BACKGROUND

Digital images and videos are represented by pixels that have color values. Typically, the color of each pixel is described by multiple component values. Each of the component values describes the extent to which a component contributes to the final color value. There are multiple methods by which sets of component values can be used to describe color values, and these methods are referred to as color spaces.

One way to represent color values is by using an RGB color space where each pixel is represented by individual values for red, green, blue color components that are added together to produce a particular color. Another way to represent color values is by separating luminance information and chrominance information, such as in a YUV color space (e.g. Y'CbCr). This type of color space is commonly used in image compression schemes for both still images and video, in part because it allows for chroma subsampling, which is a common technique for reducing the amount of data that is used to represent images and video.

Converting an image from one color space to another can result in a loss of color information. For example, some color space conversions cause a loss of spatial resolution as a result of downsampling, and some color space conversions cause range reduction (i.e., clipping) when some values in one color space are not representable in the other.

Chroma subsampling reduces the spatial resolution of color information while retaining the spatial resolution of brightness information. This reduction in color information is often not readily perceived by humans, because the human visual system is more sensitive to brightness than it is to color. There are certain types of images, however, in which chroma subsampling will introduce visually disturbing artifacts, such as in images containing text, striped patterns, checkerboard patterns, computer-rendered graphics, artificially generated smooth gradients, and in images with colorful details.

SUMMARY

Disclosed herein are implementations of chroma blurring reduction in video and images.

One implementation disclosed herein is a method includes obtaining, at one or more computing devices, an input image, applying an image sharpening process to at least one of one or more chroma components of the input image, subsampling the one or more chroma components of the input image to reduce a spatial resolution of the one or more chroma components of the input image, encoding the input image subsequent to applying the image sharpening process and subsampling, and performing at least one of storing or transmitting the input image subsequent to encoding.

Another implementation disclosed herein is an apparatus that includes a memory and a processor configured to execute instructions stored in the memory. The instructions cause the processor to obtain, at one or more computing devices, an input image, apply an image sharpening process to at least one of one or more chroma components of the input image, subsample the one or more chroma components of the input image to reduce a spatial resolution of the one or more chroma components of the input image, encode the input image subsequent to applying the image sharpening process and subsampling, and perform at least one of storing or transmitting the input image subsequent to encoding.

Another implementation disclosed herein is a non-transitory computer-readable storage device including program instructions executable by one or more processors that, when executed, cause the one or more processors to perform operations. The operations include obtaining, at one or more computing devices, an input image; applying an image sharpening process to at least one of one or more chroma components of the input image; subsampling the one or more chroma components of the input image to reduce a spatial resolution of the one or more chroma components of the input image; encoding the input image subsequent to applying the image sharpening process and subsampling; and performing at least one of storing or transmitting the input image subsequent to encoding.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The systems and methods described herein are directed to chroma blurring reduction in videos and images.

Video and images are often compressed by reducing the spatial resolution of the chroma components of the images. This reduction, which may be referred to herein as chroma subsampling, removes the colorfulness of details. Images with colorful details in subjects such as flowers or clothing may be particularly impacted by the reduction in chroma resolution. For example, the coloring of a red flower in a green environment can become much less vivid as a result of reducing the chroma resolution of the image.

In the systems and methods described herein, an image sharpening process is applied to one of more components of an image prior to or during an encoding process. The image sharpening process is applied to some or all of the components of the image that are downsampled, and the image sharpening process may be performed either before or after downsampling the component of the image. The image sharpening process is applied to one or more chroma components of an image, for example, to the V channel of an image that is represented in the YUV color space. By applying the image sharpening process during the encoding process, effects of blurring introduced into the image by scaling the channel during decoding are reduced. One example of an image sharpening process that can be utilized in the systems and methods that are described herein is an unsharp mask process that can be applied, in some implementations, using an unsharp mask filter. Other types of image sharpening processes and image enhancement processes can be utilized in the systems and methods described herein, including, in some implementations, using a sharpening filter.

Figure 1:
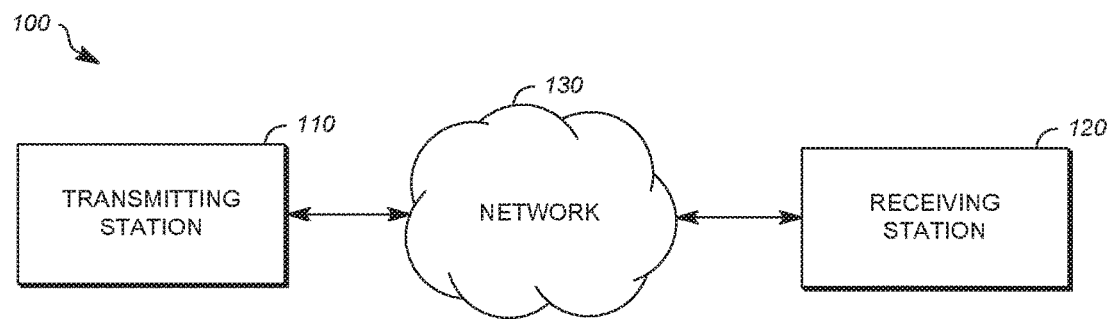
FIG. 1 is a block diagram showing an example of an environment in which a system for chroma blurring reduction can be implemented.

FIG. 1 is a block diagram showing an example of an environment 100 in which a system for chroma blurring reduction can be implemented. The environment 100 includes a transmitting station 110 and a receiving station 120 that are connected by a network 130. The transmitting station 110 and the receiving station 120 can be implemented in many ways, such as in the form of one or more computing devices having a memory and a processor. The network 130 can be or include any or all of the Internet, a local area network (LAN), wide area network (WAN), virtual private network (VPN), cellular telephone network or any other means of transferring information from the transmitting station 110 to the receiving station 120.

The transmitting station 110 is operable to perform a chroma blurring reduction operation with respect to an image, as will be discussed further herein. The chroma blurring reduction operation can be performed prior to encoding the image or as part of the encoding process.

Figure 2:
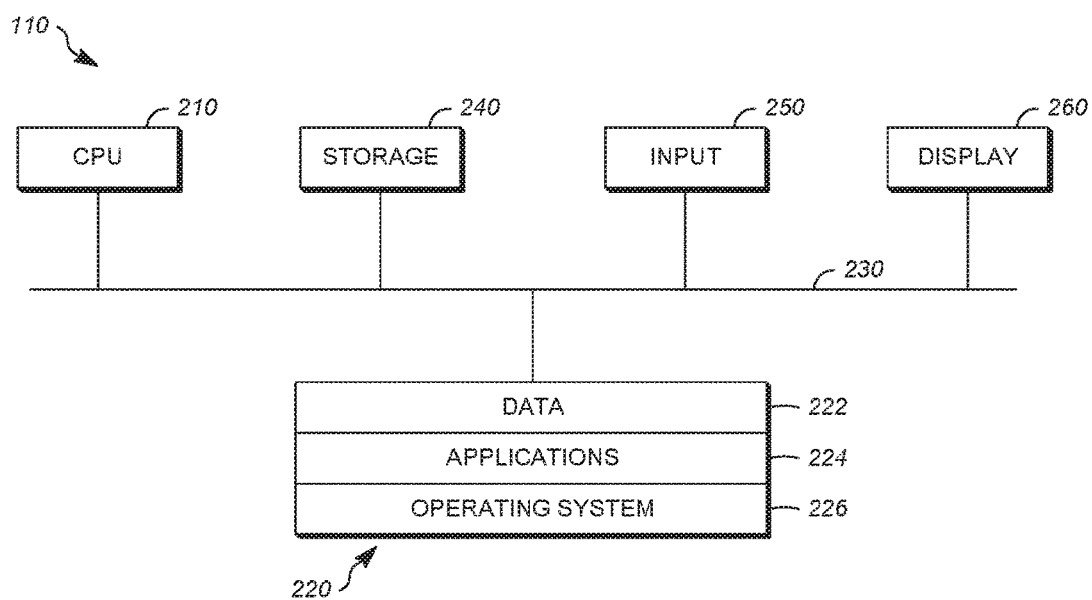
FIG. 2 is a block diagram of an example of a hardware configuration for a transmitting station of the environment of FIG. 1.

FIG. 2 is a block diagram of an example of a hardware configuration for the transmitting station 110. The same hardware configuration or a similar hardware configuration can be used to implement the receiving station 120. The transmitting station 110 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

The transmitting station 110 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving an image signal or a video signal.

Although FIG. 2 depicts the CPU 210 and the memory 220 of the transmitting station 110 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of the transmitting station 110 can be composed of multiple buses. Further, the storage device 240 can be directly coupled to the other components of the transmitting station 110 or can be accessed via a network and can comprise a single integrated unit such as a memory card or multiple units such as multiple memory cards. The transmitting station 110 can thus be implemented in a wide variety of configurations.

Figure 3:
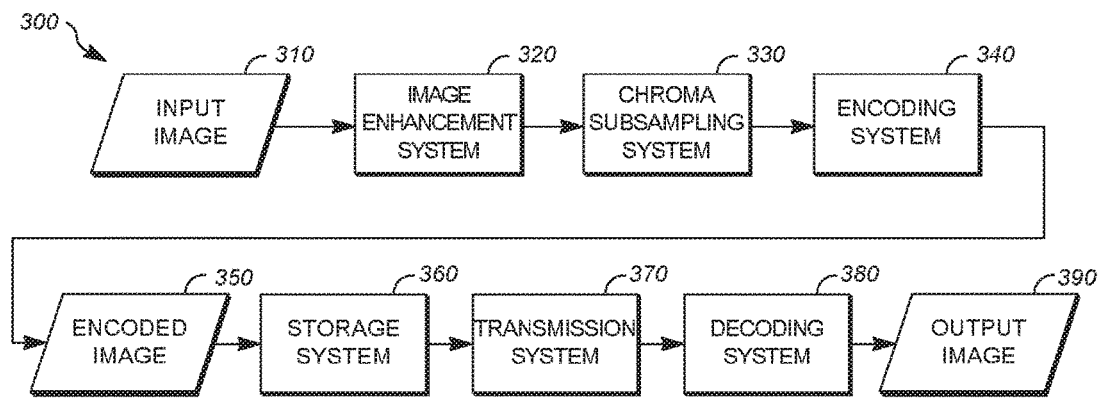
FIG. 3 is a block diagram showing an example of an image processing system.

FIG. 3 is a block diagram showing an example of an image processing system 300 in which an input image 310 is processed at a first computing device, and an encoded representation of the input image 310 stored at the first computing device and/or transmitted to a second computing device where it is decoded and output for display. The image processing system 300 can be implemented, for example, by the transmitting station 110 and the receiving station 120, by execution of computer program instructions at each of the transmitting station 110 and the receiving station 120.

The input image 310 is a digital image that is defined by a plurality of pixels, as is well known in the art. Each pixel has a color value that defines the color of the respective pixel when it is output for display. Each color value can be defined by multiple component values, such as in the RGB color space, which represents pixels as tuples of red, green, and blue component values. Other color spaces can be utilized for the input image 310. In some implementations, the input image can be a still image, such as a compressed or uncompressed bitmap image in any suitable format. In other implementations, the input image can be a video frame or part of a video frame from a video, which can be received, for example, in the form of a video bitstream.

The image processing system 300 includes an image enhancement system 320 and a chroma subsampling system 330. The image enhancement system 320 utilizes an image sharpening technique to amplify high frequency information in the input image 310. The chroma subsampling system 330 reduces the spatial resolution of chroma information in the input image 310. The image enhancement system 320 is applied to amplify high frequency information in at least some of the chroma components of the input image 310 to reduce color loss as a result of chroma subsampling.

In the illustrated example of the image processing system 300, the image enhancement system 320 appears prior to the chroma subsampling system 330, indicating that image enhancement such as an image sharpening process is performed prior to the chroma subsampling process. Performing the image enhancement process prior to the chroma subsampling process has been found to produce highest quality results. The order of the image enhancement system 320 and the chroma subsampling system 330 may be reversed, such that the chroma subsampling process is performed prior to the image enhancement process. Because the chroma subsampling process reduces the amount of information in an image, performing the chroma subsampling process prior to the image enhancement process improves processing efficiency, and has been found to produce good quality results.

The input image 310 is received as an input at the image enhancement system 320. The image enhancement system 320 can be implemented, for example, by the transmitting station 110. In implementations where the image enhancement system 320 is utilized after chroma subsampling, the image enhancement system 320 receives a chroma subsampled representation of the input image 310 from the chroma subsampling system 330.

The image enhancement system 320 applies an image enhancement process such as an image sharpening technique to one or more components of the input image 310 in order to reduce blurring that can be caused by chroma subsampling. The image enhancement system 320 in applied to one or more components of the input image 310. Because the image enhancement system 320 counters loss of chrominance information, the image enhancement system 320 applies the image enhancement process to the chrominance components of the input image 310, such as the U component and/or the V component of the input image 310 in the YUV color space. The image enhancement system 320 does not apply the image enhancement process to components of the image that do not include chrominance information, such as the Y component in the YUV color space, because that information is not lost during chroma subsampling. In some implementations, the image enhancement process is applied only to the V component in the YUV color space because the human eye is far more sensitive to the red-cyan information of the V component than to the blue-yellow information of the U component.

The image enhancement system 320 may determine whether to apply the image enhancement process based on the content of the input image 310. The determination of whether to apply the image enhancement process can be made in the form of a single determination as to whether to apply the image enhancement process to the entirety of the input image 310, or the determination of whether to apply the image enhancement process can be made for individual portions (such as rectangular blocks of pixels) of the input image 310 on a portion-by-portion basis. As one example, the determination as to whether to apply the image enhancement process may be made based on comparison of an average of a component value for the input image 310 or for a portion of the input image 310 to a threshold. As one example, a determination may be applied in which the image enhancement process is applied to the V component of a portion of the input image 310 if the average of absolute values for the V component values for the portion of the input image 310 is above a threshold value, and the image enhancement process is not applied to the V component of a portion of the input image 310 if the average of absolute values for the V component values for the portion of the input image 310 is below a threshold value.

The image enhancement system 320 may determine parameters that control how the image enhancement process is applied to the input image 310 based on the content of the input image 310. For example, component values of the input image 310 from the RGB color space, the YUV color space, or other color spaces can be utilized as inputs to determine parameters for the image enhancement process. Determining parameters for the image enhancement process includes determining an enhancement strength based on a first component value of the input image 310 weighted by a second component value from the input image 310. The first and second component values used to determine the enhancement strength for the image enhancement process may be a first chroma component value and a second chroma component value. This determination of enhancement strength can be made using a psychovisual color model, such as by determining the enhancement strength based on values for the component values as expressed in the LMS color space, since high values for the M component block perception changes in low values of the S component, especially with respect to sharp details in the input image 310. Therefore, the enhancement strength could be determined based on the S component value, weight based on the M component value, such as by weighting the S component value according to an inverse of the M component value.

The input image 310 is received as an input at the chroma subsampling system 330. In implementations where chroma subsampling is performed after the image enhancement process, a sharpened version of the input image 310 is receive at the chroma subsampling system 330 from the image enhancement system 320. In implementations where the chroma subsampling process is performed before the image enhancement process, the input image 310 is received without sharpening applied to it. The chroma subsampling system 330 can be implemented, for example, by the transmitting station 110.

The chroma subsampling system 330 is operable to generate a chroma subsampled version of the input image 310. The chroma subsampled version of the input image 310 is in a format that separates luma information and chroma information, so that the spatial resolution of the chroma information can be reduced. In one implementation, the chroma subsampled version of the input image 310 is a YUV image. Without subsampling, the YUV444 image format utilizes 3 bytes per pixel. YUV images that implement subsampling reduce the amount of information needed to represent pixels. As examples, the YUV422 format utilizes 4 bytes per 2 pixels, the YUV411 format utilizes 6 bytes per 4 pixels, and the YUV420 format utilizes 6 bytes per 4 pixels.

During chroma subsampling, such as at the chroma subsampling system 330, some of the color information from the original image is discarded. In most formats, a chroma subsampled image will include a luma value (e.g. Y') for each pixel, but for each chroma component value (e.g. U and V), there will be fewer values than there are pixels. For example, in the YUV420 image format, each U value and each V value corresponds to four pixels that form a two pixel by two pixel square in the original image. As a result, when an image, such as an RGB image, is converted to a chroma subsampled format, such as YUV format, and subsequently reconstructed by converting the chroma subsampled image back to the original format, many of the pixel values in the reconstructed RGB image will be different than those in the original image as a result of the reduction in spatial resolution of the U and V components in the chroma subsampled YUV image.

Subsequent to processing by the image enhancement system 320 and the chroma subsampling system 330, the sharpened and chroma subsampled version of the input image 310 is received as an input at an encoding system 340. The encoding system 340 can be implemented, for example, by the transmitting station 110.

The encoding system 340 is operable to compress the chroma subsampled version of the input image 310. There are many well-known still image and video encoding formats that can be implemented by the encoding system. It is also expected that the methods and systems described herein will be used in conjunction with subsequently developed still image and video encoding schemes. Because potential artifacts due to chroma subsampling are addressed at the chroma subsampling system 330 and the chroma subsampled version of the input image 310 is provided to the encoding system in a standard format, the process described herein can be implemented without otherwise modifying the encoding process. Thus, the encoding system 340 can be conventional in nature. In some implementations, however, the image enhancement system 320 and the chroma subsampling system 330 can be incorporated in the encoding process that is performed by the encoding system 340, but the combined systems can operate in the same manner as separate systems.

The output of the encoding system 340 is an encoded version of the input image 310, which is referred to herein as an encoded image 350. The encoded image 350 can be stored for later use and/or transmission. For example, the encoded image 350 can be stored at a storage system 360, which may be implemented at the transmitting station 110 or at a separate computing device.

The transmission system 370 is operable to obtain the encoded image 350 and transmit it to a remote computing device. The transmission system 370 can be implemented, for example, by the transmitting station 110 sending the encoded image 350 to the receiving station 120. The transmission can be made in any suitable manner, for example, via the network 130. It should be noted that transmission of the encoded image 350 can occur multiple times, such as by a multicast transmission to multiple endpoints or by repeated transmissions over a prolonged period of time to any number of endpoints.

The transmission of the encoded image 350 is received as an input at a decoding system 380. The decoding system 380 can be implemented, for example, by the receiving station 120.

The decoding system 380 is operable to decompress the encoded image 350. The decoding system 380 employs a decoding method that corresponds to the format in which the encoded image 350 is encoded, with the operations of the decoding process being the inverse of those in the encoding system 340. As with the encoding system 340, the decoding system 380 is conventional in nature and need not be modified to accommodate the sharpening applied by the image enhancement system 320. Instead the image enhancement process performed at the encoding system 340 is operable to counteract degradation in image quality that occurs as a result of the chroma subsampling at the encoding system 340 and the subsequent chroma upsampling that occurs at the decoding system 380. The output of the decoding system 380 is an output image 390, which can be output for display, such as at a display device associated with the receiving station 120.

Figure 4:
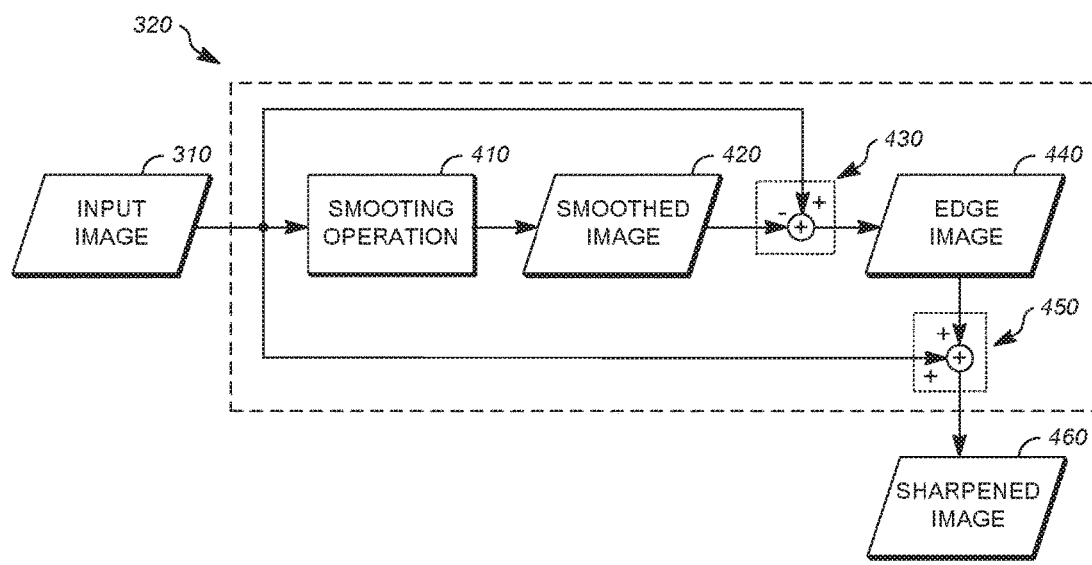
FIG. 4 is a block diagram showing an example of an image enhancement system of the image processing system of FIG. 3.

FIG. 4 is a block diagram showing an example of the image enhancement system 320 of the image processing system 300. In the example shown in FIG. 4, the image enhancement system 320 applies an unsharp mask process to the input image 310. It should be understood that the image enhancement system 320 could instead apply other image enhancement techniques, such as a different type of sharpening technique, to counteract the loss of image fidelity caused by chroma subsampling.

The image enhancement system 320 receives the input image 310 as described with respect to the image processing system 300. The image enhancement system 320 may apply the unsharp mask process to all components of the input image 310, and this may be performed in, for example, the RGB color space. The unsharp mask process may also be applied only to certain components of the input image 310, such as chroma components, and this may be performed in, for example, the YUV color space with respect to the U component or the V component. Three copies of the input image 310 are utilized in operations performed by the image enhancement system 320, and the input image 310 may be held in a buffer for use in these operations.

A first copy of the input image 310 is used as an input in a smoothing operation 410. The smoothing operation 410 generates a smoothed image 420, which may be referred to as an unsharp version of the input image 310. The smoothing operation 410 generates the smoothed image 420 by reducing the frequency of pixel values or component values in the input image 310. The smoothing operation 410 may be applied at a desired intensity level that controls the degree to which the input image 310 is smoothed, with higher intensities of smoothing corresponding to higher losses of high-frequency information from the input image 310.

The smoothing operation 410 may employ any conventional smoothing or blurring operation. As an example, the smoothing operation 410 may replace each pixel value or component value in the input image 310 with a smoothed value that is calculated as a weighted average of pixel values in the neighborhood (i.e. surrounding area) of the respective pixel value, with the neighborhood size and weightings being selected as a function of the desired intensity level for the smoothing operation 410. One example of a blurring function that can be used in the smoothing operation is a Gaussian function, and the desired intensity level for the smoothing operation 410 can be set according to the size of the Gaussian filter used.

The smoothed image 420 is useful for identifying areas of low frequency information and areas of high frequency information in the input image 310 by a masking operation 430. In the masking operation 430, a second copy of the input image 310 is combined with the smoothed image 420, by pixel-wise or component-wise subtraction of smoothed image 420 from the input image 310. The output of the masking operation 430 is an edge image 440. In areas of the input image 310 that have low-frequency information (i.e., little variance in values from pixel to pixel), the pixel values or component values in the input image 310 will differ very little from the pixel values or component values in the smoothed image 420. Thus, in low-frequency areas of the input image 310, the pixel values or component values in the edge image 440 are zero or near zero. In some implementations, thresholding may be applied in generating the edge image 440 to set pixel or component values that are below a threshold value to zero.

In a sharpening operation 450, the edge image 440 is combined with a third copy of the input image 310 by pixel-wise or component-wise addition. Because the edge image 440 includes pixel values or component values that are based on the frequency of the information in the input image 310, high frequency areas of the input image 310 are amplified, and low frequency areas of the input image 310 are unchanged. To adjust the strength of the sharpening applied by the sharpening operation 450, a scaling factor may be applied to the edge image 440, by multiplying the pixel values or component values of the edge image 440 by the scaling factor. The output of the sharpening operation 450 is a sharpened image 460, which may be utilized in the image processing system 300 as an input to other components of the system, such as the chroma subsampling system 330.

The description above of a specific implementation of the image enhancement system 320 is made to allow understanding of the subject matter. Persons of skill in the art will understand that an unsharp mask process may by applied by convolution of a kernel with the input image 310, which can produce results equivalent to those obtained in the process described above.

Figure 5:
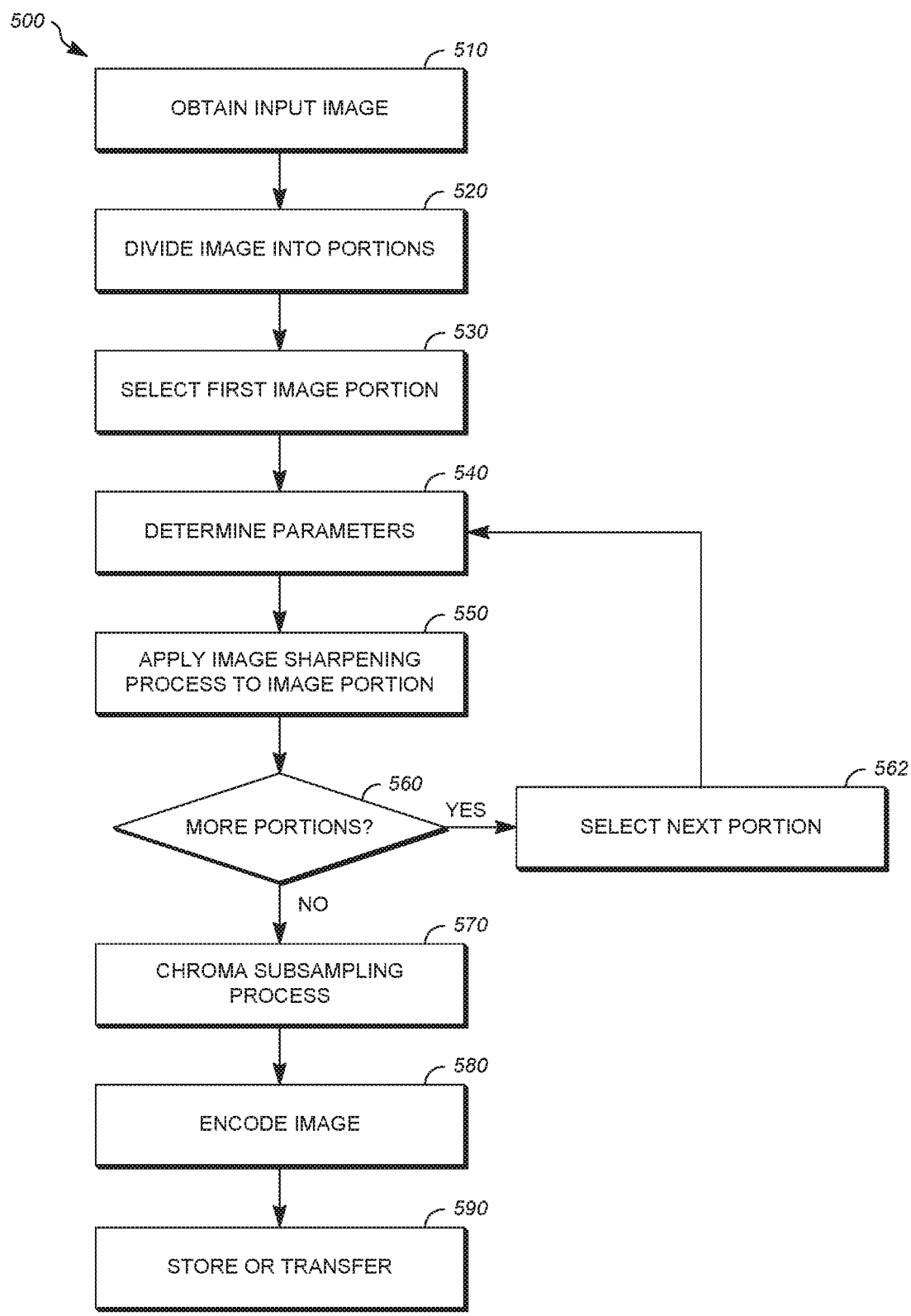
FIG. 5 is a flowchart showing a first example of a process for chroma blurring reduction.

FIG. 5 is a flowchart showing a first example of a process 500 for chroma blurring reduction that can be implemented by the chroma subsampling system 330 in the image processing system 300. The process 500 can also be employed in contexts other than the image processing system 300.

The operations described in connection with the process 500 and other processes described herein can be performed at one or more computers, such as at that transmitting station 110, and can be embodied as a non-transitory computer readable storage medium including program instructions executable by one or more processors that, when executed, cause the one or more processors to perform the operations. For example, the operations described in connection with the process 500 could be stored at the memory 220 of one of the receiving station 120 and be executable by the CPU 210 thereof.

In operation 510 an input image is obtained, such as the input image 310. The input image can be obtained, for example, by accessing the image from memory, accessing the image from a storage device, or receiving the image via a network transmission such as a transmission from the transmitting station 110 to the receiving station 120 via the network 130. If necessary, the image can be decoded to obtain pixel values for the image. The input image may also be converted from one color space to another, such as by converting the image from the RGB color space to the YUV color space. In this example, conversion to the YUV color space at this point in the process 500 is performed without subsampling of the U and/or V components of the image. The input image may be a still image, a portion of a still image, a video frame, or a portion of a video frame.

In operation 520, the image is divided into portions. As examples, the image may be divided into rectangular portions of a fixed size, the image may be divided into rectangular portions of a dynamic size based on image content, or the image may be divided into areas of an arbitrary shape or size. Dividing images into portions of a dynamic size may be based on the content of the image, with the size of an area being based on variance in pixel values or component values, such that larger portions are used in areas of the image that have low variance in pixel values or component values, and smaller portions are utilized in areas of the image that have high variance in pixel values or component values. Operation 520 can be omitted, and the image may be processed as a whole, without dividing the image into portions. In operation 530 a first portion of the image is selected for processing. Any order may be used, such as a top-to-bottom and left-to-right order. In implementations where operation 520 is omitted and the image is not divided into portions, operation 530 is also omitted.

In operation 540, sharpening parameters are determined for an image sharpening process that will be applied to the current portion of the image. In some implementations, the sharpening parameters are determined based on the content of the current portion of the image, such as the pixel values and/or component values, or an average of the pixel values and or component values. The sharpening parameters may be predetermined parameters. The sharpening parameters may include those previously described with respect to the image enhancement system 320, such as the intensity level for smoothing applied to identify high-frequency and low frequency portions of the image, and a strength of the sharpening applied to the image. Determining sharpening parameters for the current portion of the image may include determining that sharpening is not to be applied to the current portion of the image. In implementations where operation 520 is omitted and the image is not divided into portions, sharpening parameters may be determined based on the contents of the entire image or default sharpening parameters may be used.

In operation 550, an image sharpening process is applied to the current portion of the image, using the sharpening parameters that were determined in operation 540. The image sharpening process may be the unsharp mask process as described with respect to the image enhancement system 320. The image sharpening process of operation 550 is applied only to the chrominance components of the image and is not applied to the luminance components of the image. If the image is in the YUV color space, the image sharpening process is applied to the U and/or V components of the image and is not applied to the Y component of the image. In one example, the image sharpening process is applied to the V components of the image and is not applied to the Y and U components of the image. In another example, the image sharpening process is applied to the U and V components of the image and is not applied to the Y component of the image. In implementations where operation 520 is omitted and the image is not divided into portions, the image sharpening process is applied to the entirety of the one or more components that are being sharpening in operation 550.

In operation 560 if additional portions of the image remain that have not yet been processed by operations 540 and 550, the process 500 advances to operation 562 where the next portion of the image is selected, and then the process returns to operation 540. If, at operation 560, all portions of the image have been processed by operations 540 and 550, the process 500 advances to operation 570. In implementations where operation 520 is omitted and the image is not divided into portions, operations 560 and 562 are also omitted.

In operation 570, a chroma subsampling process is applied to the sharpened version of the input image from operation 560. Chroma subsampling may be performed in the manner described in connection with the chroma subsampling system 330 of the image processing system 300. In operation 580, the image is encoded. Encoding the image can be performed in the manner described with respect to the encoding system 340 of the image processing system 300.

In operation 590, the image is stored and/or transferred to another computing device. Storage and or transfer of the image may be performed in the manner described in connection with the storage system 360 and/or the transmission system 370 of the image processing system 300.

Figure 6:
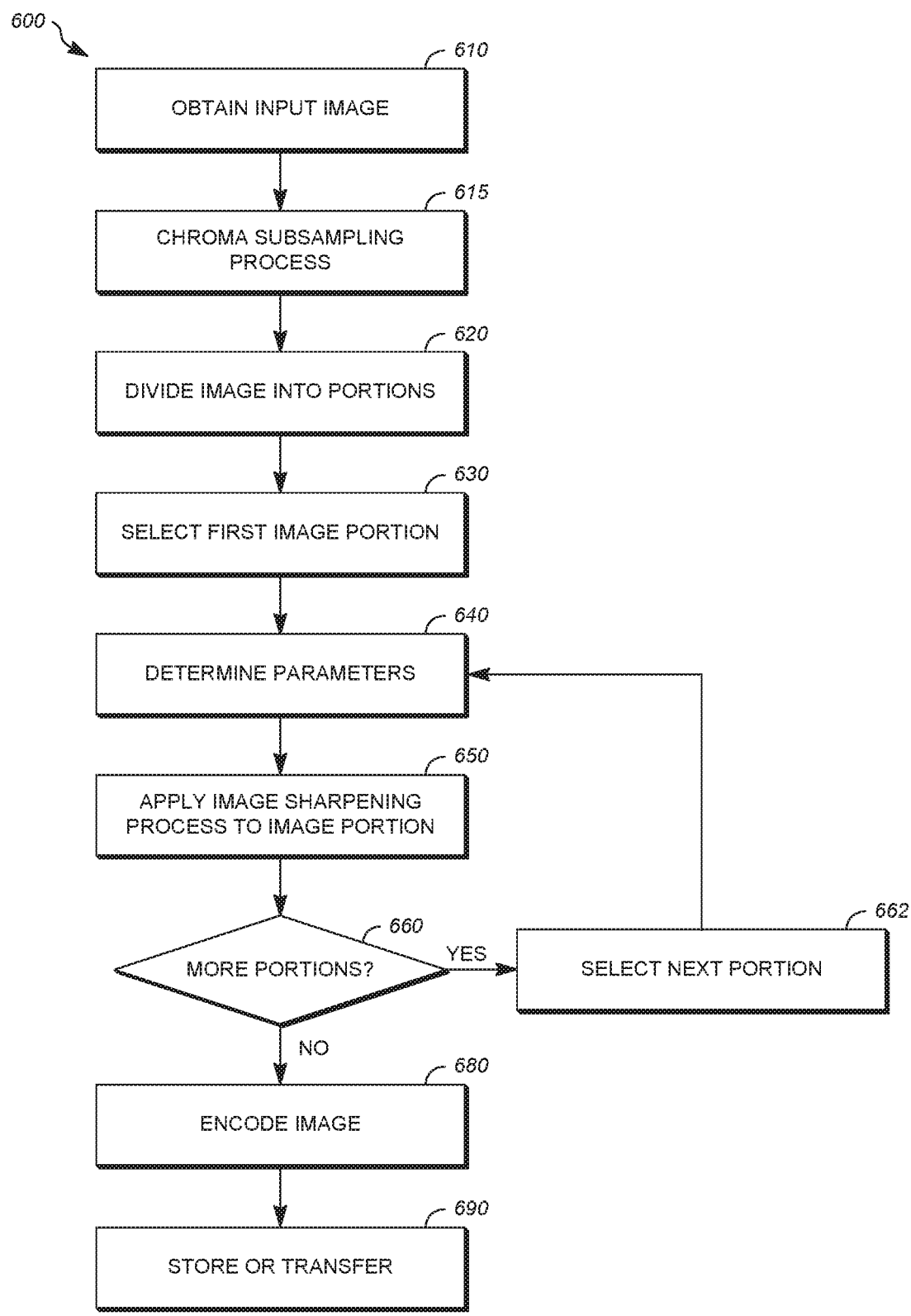
FIG. 6 is a flowchart showing a first example of a process for chroma blurring reduction.

FIG. 6 is a flowchart showing a second example of a process 600 for chroma blurring reduction that can be implemented by the chroma subsampling system 330 in the image processing system 300. The process 600 can also be employed in contexts other than the image processing system 300.

The operations described in connection with the process 600 and other processes described herein can be performed at one or more computers, such as at that transmitting station 110, and can be embodied as a non-transitory computer readable storage medium including program instructions executable by one or more processors that, when executed, cause the one or more processors to perform the operations. For example, the operations described in connection with the process 600 could be stored at the memory 220 of one of the receiving station 120 and be executable by the CPU 210 thereof.

In operation 610 an input image is obtained, such as the input image 310. The input image can be obtained, for example, by accessing the image from memory, accessing the image from a storage device, or receiving the image via a network transmission such as a transmission from the transmitting station 110 to the receiving station 120 via the network 130. If necessary, the image can be decoded to obtain pixel values for the image. The input image may be a still image, a portion of a still image, a video frame, or a portion of a video frame.

In operation 615, a chroma subsampling process is applied to the sharpened version of the input image from operation 660. As part of operation 615, the input image is converted to a format that separates chrominance information from luminance information, if it is not already in such a format. For example, the input image may be converted from the RGB color space to the YUV color space. Chroma subsampling may be performed in the manner described in connection with the chroma subsampling system 330 of the image processing system 300.

In operation 620, the chroma subsampled version of the input image is divided into portions. As examples, the image may be divided into rectangular portions of a fixed size, the image may be divided into rectangular portions of a dynamic size based on image content, or the image may be divided into areas of an arbitrary shape or size. Dividing images into portions of a dynamic size may be based on the content of the image, with the size of an area being based on variance in pixel values or component values, such that larger portions are used in areas of the image that have low variance in pixel values or component values, and smaller portions are utilized in areas of the image that have high variance in pixel values or component values. Operation 620 can be omitted, and the image may be processed as a whole, without dividing the image into portions. In operation 630 a first portion of the image is selected for processing. Any order may be used, such as a top-to-bottom and left-to-right order. In implementations where operation 620 is omitted and the image is not divided into portions, operation 630 is also omitted.

In operation 640, sharpening parameters are determined for an image sharpening process that will be applied to the current portion of the image. In some implementations, the sharpening parameters are determined based on the content of the current portion of the image, such as the pixel values and/or component values, or an average of the pixel values and or component values. The sharpening parameters may be predetermined parameters. The sharpening parameters may include those previously described with respect to the image enhancement system 320, such as the intensity level for smoothing applied to identify high-frequency and low frequency portions of the image, and a strength of the sharpening applied to the image. Determining sharpening parameters for the current portion of the image may include determining that sharpening is not to be applied to the current portion of the image. In implementations where operation 620 is omitted and the image is not divided into portions, sharpening parameters may be determined based on the contents of the entire image or default sharpening parameters may be used.

In operation 650, the image sharpening process is applied to the current portion of the image, using the sharpening parameters that were determined in operation 640. The image sharpening process may be the unsharp mask process as described with respect to the image enhancement system 320. The image sharpening process of operation 650 is applied only to the chrominance components of the image and is not applied to the luminance components of the image. If the image is in the YUV color space, the image sharpening process is applied to the U and/or V components of the image and is not applied to the Y component of the image. In one example, the image sharpening process is applied to the V components of the image and is not applied to the Y and U components of the image. In another example, the image sharpening process is applied to the U and V components of the image and is not applied to the Y component of the image. In implementations where operation 620 is omitted and the image is not divided into portions, the image sharpening process is applied to the entirety of the one or more components that are being sharpening in operation 550.

In operation 660 if additional portions of the image remain that have not yet been processed by operations 640 and 650, the process 600 advances to operation 662 where the next portion of the image is selected, and then the process returns to operation 640. If, at operation 660, all portions of the image have been processed by operations 640 and 650, the process 600 advances to operation 680. In implementations where operation 620 is omitted and the image is not divided into portions, operations 660 and 662 are also omitted.

In operation 680, the image is encoded. Encoding the image can be performed in the manner described with respect to the encoding system 340 of the image processing system 300.

In operation 690, the image is stored and/or transferred to another computing device. Storage and or transfer of the image may be performed in the manner described in connection with the storage system 360 and/or the transmission system 370 of the image processing system 300.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 110 and/or receiving station 120 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 110 and receiving station 120 do not necessarily have to be implemented in the same manner.

The transmitting station 110 and/or the receiving station 120 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Further, all or a portion of implementations of the disclosure herein can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   obtaining, at one or more computing devices, an input image;
   generating, by a processor, a sharpened image based on the input image by sharpening a chrominance component of the input image;
   generating a subsampled image based on the sharpened image by subsampling the chrominance component;
   generating an encoded image by encoding the subsampled image; and
   outputting the encoded image.

2. The method of claim 1, wherein the sharpening includes applying an unsharp mask.

3. The method of claim 1, wherein the sharpening includes:
   determining sharpening parameters based on content of the input image; and
   sharpening the chrominance component based on the sharpening parameters.

4. The method of claim 3, wherein obtaining the input image includes dividing the input image into portions, and wherein the sharpening is performed on a portion-by-portion basis.

5. The method of claim 3, wherein determining the sharpening parameters includes determining a sharpening strength based on a first component value based on the input image weighted by a second component value based on the input image.

6. The method of claim 1, wherein the input image is represented in an RGB color space, wherein obtaining the input image includes:
   converting the input image to a color space having the chrominance component.

7. The method of claim 1, wherein generating the sharpened image omits sharpening a luminance component of the input image.

8. The method of claim 1, wherein generating the sharpened image omits sharpening a second chrominance component of the input image.

9. An apparatus, comprising:
   a processor configured to:
   obtain an input image,
   generate a sharpened image based on the input image by sharpening a chrominance component of the input image,
   generate a subsampled image based on the sharpened image by subsampling the chrominance component,
   generate an encoded image by encoding the subsampled image, and
   output the encoded image.

10. The apparatus of claim 9, wherein the sharpening includes applying an unsharp mask.

11. The apparatus of claim 9, wherein the the sharpening includes:
    determining sharpening parameters based on content of the input image; and
    sharpening the chrominance component based on the sharpening parameters.

12. The apparatus of claim 11, wherein the processor is further configured to:
    divide the input image into portions, wherein the sharpening is performed on a portion-by-portion basis.

13. The apparatus of claim 11, wherein the sharpening includes determining a sharpening strength based on a first component value based on the input image weighted by a second component value based on the input image.

14. The apparatus of claim 9, wherein the input image is represented in an RGB color space, and the processor is configured to convert the input image to a color space having the chrominance component.

15. The apparatus of claim 9, wherein the processor is configured to generate the sharpened image by omitting sharpening a luminance component of the input image.

16. The apparatus of claim 9, wherein the processor is configured to generate the sharpened image by omitting a second chrominance component of the input image.

17. A non-transitory computer-readable storage device including program instructions executable by one or more processors that, when executed, cause the one or more processors to perform operations, the operations comprising:
    obtaining an input image;
    generating, by a processor, a sharpened image based on the input image by sharpening a chrominance component of the input image;
    generating a subsampled image based on the sharpened image by subsampling the chrominance component;
    generating an encoded image by encoding the subsampled image; and
    outputting the encoded image.

18. The non-transitory computer-readable storage device of claim 17, wherein the sharpening includes applying an unsharp mask.

19. The non-transitory computer-readable storage device of claim 17, wherein the sharpening includes:
    determining sharpening parameters based on content of the input image; and
    sharpening the chrominance component based on the sharpening parameters.

20. The non-transitory computer-readable storage device of claim 19, wherein obtaining the input image includes dividing the input image into portions, and wherein the sharpening is performed on a portion-by-portion basis.

21. The method of claim 19, wherein determining the sharpening parameters includes determining a sharpening strength based on a first component value based on the input image weighted by a second component value based on the input image.

22. The non-transitory computer-readable storage device of claim 17, wherein the input image is represented in an RGB color space, wherein obtaining the input image includes:
   converting the input image to a color space having the chrominance component.

23. The non-transitory computer-readable storage device of claim 17, wherein generating the sharpened image omits sharpening a luminance component of the input image.

24. The non-transitory computer-readable storage device of claim 17, wherein generating the sharpened image omits sharpening a second chrominance component of the input image.

\* \* \* \* \*